United States Patent [19]

Desor

[11] 4,338,065
[45] Jul. 6, 1982

[54] THERMO-PNEUMATIC PUMP

[75] Inventor: Gerhard Desor, Bad Homburg, Fed. Rep. of Germany

[73] Assignee: Hauser Verwaltungs-Gesellschaft mit beschrankter Haftung, Oberursel, Fed. Rep. of Germany

[21] Appl. No.: 954,688

[22] Filed: Oct. 25, 1978

[30] Foreign Application Priority Data

Nov. 9, 1977 [DE] Fed. Rep. of Germany ....... 2750051

[51] Int. Cl.³ .............................................. F04B 19/24
[52] U.S. Cl. .................................... 417/207; 219/511
[58] Field of Search ........................ 417/207; 219/511; 60/325, 527, 528, 529

[56] References Cited

U.S. PATENT DOCUMENTS 2,510,427 6/1950 Soucie ................................. 417/207
2,554,534 5/1951 Long et al. ....................... 60/523 X
3,142,149 7/1964 Hays ......................................... 60/528
3,798,894 3/1974 Romanenko et al. ................. 60/528

FOREIGN PATENT DOCUMENTS 83070 7/1957 Denmark ........................... 417/207
1142229 2/1969 United Kingdom .

Primary Examiner—William L. Freeh
Assistant Examiner—Edward Look
Attorney, Agent, or Firm—Felfe & Lynch

[57] ABSTRACT

A thermo-pneumatic pump especially for indicating the state of fill in a liquid container. The pump includes a pump chamber and housing, a valve, a heating conductor positioned in the pump chamber and an electric switch controlled by the heating conductor. The heating conductor is attached at one end to the actuating element of the electric switch.

13 Claims, 5 Drawing Figures

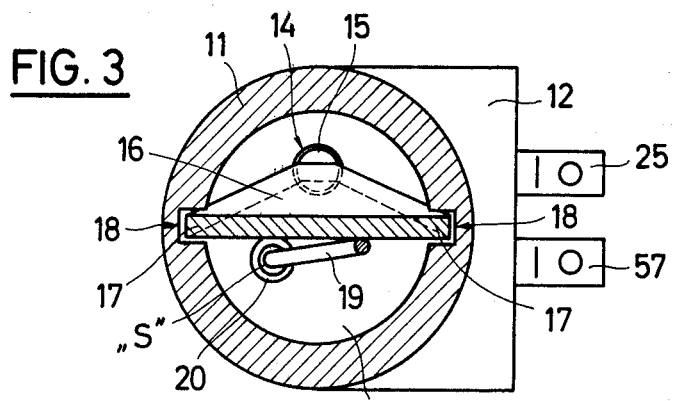
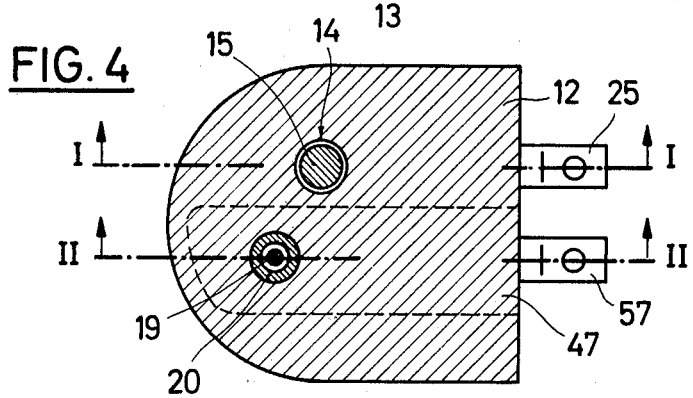
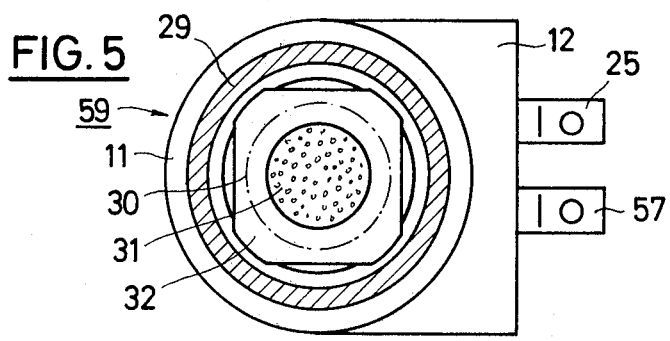

THERMO-PNEUMATIC PUMP

BACKGROUND

This invention relates to a thermo-pneumatic pump, particularly for indicating the state of fill in liquid containers by means of an immersion tube. The pump includes a pump chamber having at least one valve, a heating conductor arranged in the pump chamber, and an electric switch controlled by the heating conductor.

In indicating a state of fill by means of an immersed tube, a small thin tube is arranged vertically in the liquid to be monitored and is immersed to an extent corresponding to the measuring range. A stream of gas is introduced into the immersed tube and displaces the liquid in the tube. The hydrostatic pressure that builds up when this happens is a measure of the depth to which the tube is immersed and for the state of fill of the container to be monitored. For reasons of safety, use is made of a small excess of gas so that a little gas continuously emerges from the end of the immersed tube. Apart from hand pumps comprising a piston or a diaphragm, what are known as thermo-pneumatic pumps are used for generating the gas pressure.

German Pat. Nos. OS 18 05 479 and 19 15 743 disclose thermo-pneumatic pumps comprising heating conductors coiled through several turns, in which periodic heating and cooling of the heating conductor which, in conjunction with suitable valves, finally imparts movement to the gas, are controlled by an external electronic impulsing means. Although the desired object of rendering the switching operations independent of temperature is achieved, the expense involved is considerable because of the electrical components, such as transistors, timing devices, etc., that are required. Since the subject matter of the invention is an article that is to be mass-produced at a reasonable cost, the known solution was abandoned. The main purpose to which such thermo-pneumatic pumps are put is that of indicating the state of fill in the fuel tanks of motor vehicles. Recently, checking of the oil level in the crank chambers of internal combustion engines has also assumed greater importance. In this connection, a particularly accurate indication over an extremely narrow measuring range of a few millimeters water column is required. This need imposes particularly stringent requirements as regards the precision and reliability not only of the pressure-measuring instrument used, but also of the thermo-pneumatic pump.

German Pat. No. 12 49 550 also discloses a thermo-pneumatic pump of the kind initially described in which automatic control is achieved by means of a bimetal switch. In this pump, the heating conductor acts directly on the bimetal switch. However, a considerable delay factor is involved in the transmission of heat from the heating conductor to the bimetal. Furthermore, because of the mass of the bimetal, a bimetal switch has a considerable thermal inertia which manifests itself when the heat of the heating conductor acts directly on the bimetal. The two-fold thermal inertia makes it necessary to operate the heating conductor under low power or at low temperature so as to avoid destruction of the heating conductor if the system remains switched on too long. However, operation at low temperature leads to marked dependence upon the ambient temperature. In this connection it has to be borne in mind that the energy balance is adversely influenced by the dissipation of heat from the heating conductor itself and from the bimetal which is large in terms of area. Because of the unavoidable lengthy cycles, a pronouncedly discontinuous mode of operation results which manifests itself in a continuous oscillation affecting the indication. Such an apparatus cannot be used for monitoring the oil level in an internal combustion engine.

SUMMARY

The present invention improves thermo-pneumatic pumps in such a way that their operational behavior during the rapid sequence of cycles remains largely unaffected by the ambient temperature, without external control by means of an electronic impulse generator being necessary for the purpose.

According to the thermo-pneumatic pump of the invention, the heating conductor, which takes the form of an extensible member, is mechanically connected at one of its ends to the actuating element of the electric switch.

DESCRIPTION

The arrangement in accordance with the invention imparts a two-fold function to the heating conductor: it serves to heat up the gas to be moved and to actuate the electric switch in the sense of providing automatic control. In this way the arrangement is considerably simplified, and this has an advantageous effect in mass-producing the article of the invention. Simplification of the arrangement means that operational reliability is correspondingly great. Standard resistor wires in a length of approximately 80 to 120 mm and having diameters of between roughly 0.1 and 0.3 mm can be used as the heating conductor. A wire diameter of 0.15 mm has proved particularly suitable. Inherent in resistance wires, as in practically all metals and metal alloys, is the ability to increase in length, in accordance with their coefficients of expansion, when heated. This property can be used in an advantageous manner in conjunction with an electric switch.

Surprisingly, it has been found in this connection that very short cycle times can be achieved. Depending upon the nature of the switch used or upon the position of the switching points of the switch, switching times of approximately 1/10 to ¼ of a second can be reached, the "on" period being largely independent of the wire-thickness used. However, the "on" period can be influenced by prestressing the wire to varying extents, and with a more heavily stressed wire longer "on" times occur at a higher frequency. However, it is preferred not to use an "on" time that is so great that the heating conductor can be seen to glow. The "off" period on the other hand, depends upon the diameter of the heating conductor. Shorter "off" times of approximately 1 to 3 seconds are obtained with a wire diameter of 0.11 mm, average "off" times of approximately 2 to 5 seconds, with a wire diameter of 0.15 mm, and longer "off" times of between 3 and 8 seconds, with a wire diameter of 0.18 mm. The "off" times can be varied within the stated ranges by varying the degree of prestressing. A very considerable advantage is achieved by the use of a snap-action switch known per se, since this provides a spontaneous "on" and "off" operation so that faulty conditions in effecting contact are excluded.

A pronounced dependence of switching behavior on ambient temperature could not be observed, and this is presumably attributable to the fact that at the end of the "on" period, the heating conductor reaches temperatures which are several hundred degrees above the ambient temperature, so that a change in the bottom temperature level does not cause interference. Because of the very rapid sequence of signals, an almost continuous flow of air is achieved, and, in conjunction with a corresponding damping action in the indicating instrument enables a steady indication to be obtained.

In its simplest form, the heating conductor is rectilinear and extends parallel to the major axis through the pump chamber. It is particularly advantageous to design the pump chamber as part of a sleeve-like pump housing, to secure the electric switch to the pump housing and outside the pump chamber, and to pass the heating conductor through an opening in the pump housing, leaving an annular clearance "S" between the conductor and this opening, and to connect the conductor to the actuating element of the switch near the point where it passes through the pump housing. In this arrangement, the clearance "S" takes the place of a second valve. As explained above, the "on" period is approximately ¼ to 1/100 of the "off" period so that during the relatively very short "on" period, expansion of the gas or the air results in a pressure thrust which on the one hand can cause a return valve having a suitable large outlet cross-section to respond, but on the other hand does not move any substantial quantities of gas through the gap constituted by the clearance "S." After the heating conductor is disconnected, i.e., after the pressure thrust has died out, the non-return valve closes again, but during the relatively lengthy cooling period complete equilization of the pressure in the pump chamber and that of the atmosphere can take place by way of the chamber "S." The number of moving parts can be substantially reduced in the article of the invention.

According to a further feature of the invention and for the purpose of achieving a specific throttling effect in the zone of the clearance "S," a metallic sleeve, which surrounds the heating conductor and has an inside diameter appreciably greater than the diameter of the heating conductor, is arranged in the pump housing at the point where the heating conductor passes therethrough. Both the heating conductor and the appropriate metallic sleeves can be very precisely dimensioned so that a suitable flow cross-section can also be precisely maintained when producing the device in large numbers. The metallic sleeve offers the further advantage that a thermoplastic synthetic material, for example, can be used for the pump housing. As explained above, very high peak temperatures occur in the heating conductor, and the possibly harmful effects of these temperatures on the plastics material can be nullified by the metallic sleeve.

By using only one valve, designed as a non-return valve, it is possible to fit this valve at the end of the sleeve-like pump housing particularly when the valve is of axially symmetrical design. In this way the pump housing and the valve can be disposed coaxially so that the entire thermo-pneumatic pump is only slightly larger than a fountain pen. Consequently, the pump occupies a reduced amount of space and can be fitted in the engine compartment.

According to a still further feature of the invention, such a valve can be made of wear-resisting and corrosion-free parts. It is particularly advantageous if the valve consists of a valve seat having an axially symmetrical knife-like sealing edge, of a plate made of elastomeric material, and of a reset element of elastomeric foam material. The opening of such a non-return valve requires extremely low forces, while on the other hand it closes in a safe and positive manner against any return flow of the conveyed air.

The non-return valve can be fitted in the pump housing in a very simple manner if it is secured at the end of the pump housing by a housing cap having at least one port for an air pipe. The particular advantage of such an arrangement will be seen from the specific description hereinafter. By designing the housing cap to include two ports, the use of a special tubular T-piece is rendered unnecessary. Whereas one of the ports is connected to the immersion tube by way of a hose, the other port can be connected by a further hose to the indicating instrument. In this case, the hydrostatic pressure passes from the immersion tube to the indicating instrument by way of the space within the housing gap.

If the pump housing is made of metal, that end of the heating conductor remote from the switch may be secured to the pump housing but insulated therefrom. However, it has been stated above that the pump housing can be made of a thermoplastic synthetic material. Such material has a greater coefficient of thermal expansion than do metallic materials, so that if a plastics housing is used, it is preferred to secure the end of the heating supporting element which also serves to deliver current. It is particularly advantageous if this supporting element extends substantially parallel to the heating conductor without, however, touching it over any substantial part of its length, and runs to the side of the pump housing through the pump chamber on which the electric switch is fitted, the supporting element being mounted to be longitudinally displaceable in the pump housing by means of a displacement device. By simply displacing the supporting element in the longitudinal direction it becomes possible to vary the prestress applied to the heating conductor so that the above-described influence on the "on" period and the "off" period results.

Particular advantage accrues if the supporting element is provided at one of its ends with a cylindrical stud whereby it is guided in a bore formed in the pump housing, whereas it takes the form of a disc at its other end, the longitudinal edges of this end being guided in longitudinal channels in the pump housing, and the cylindrical stud bearing against a set-screw. In this way the supporting element, although readily displaceable in the axial direction, is secured against rotation in the pump housing. Prevention of rotation is of particular importance since the heating conductor, because of its being spaced from the supporting element, applies torque and bending moment to said element which should not be influenced thereby.

An embodiment of the subject matter of the invention and details thereof will now be explained in greater detail by reference to FIGS. 1 to 5.

DESCRIPTION OF THE DRAWINGS

The present invention will be more fully understood from the following description taken in conjunction with the accompanying drawing wherein:

FIG. 3 is a section on the line III—III of FIG. 1;

FIG. 4 is a section on the line IV—IV in FIG. 1; and
FIG. 5 is a section on the line V—V of FIG. 1.

Figure 1:
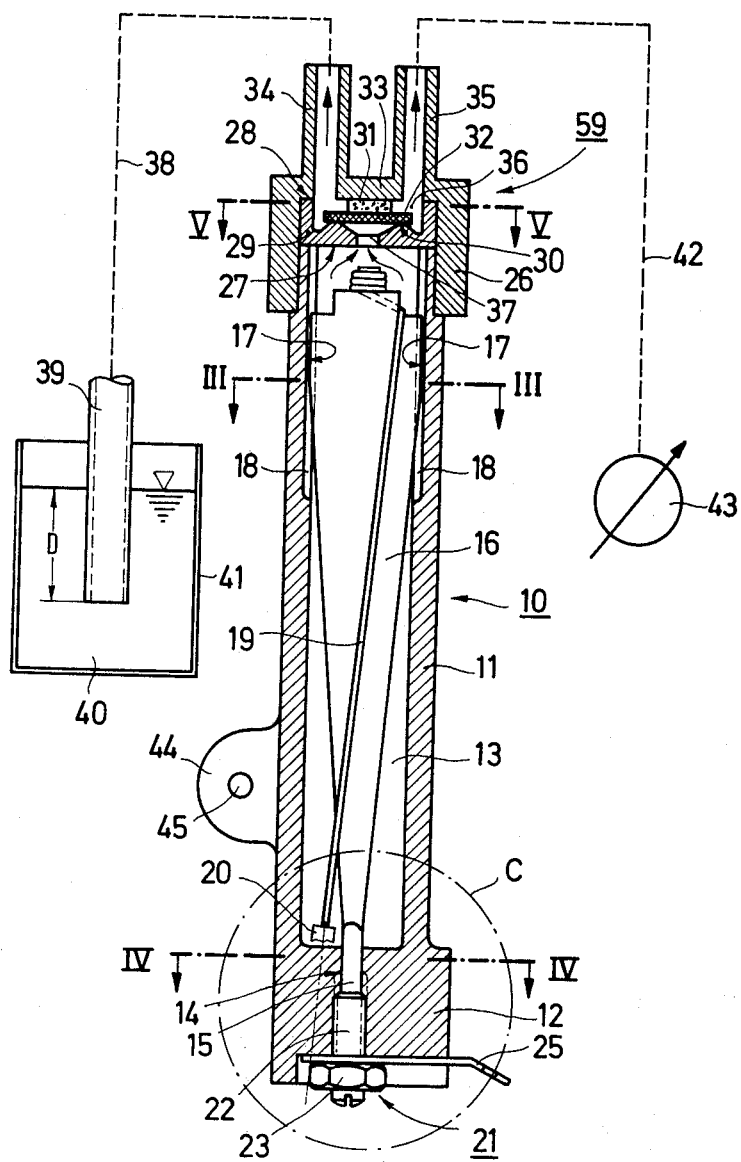
FIG. 1 is a longitudinal section, on line I—I of FIG. 4, through the complete article of the invention, a measuring arrangement also being shown diagrammatically.
Figure 2:
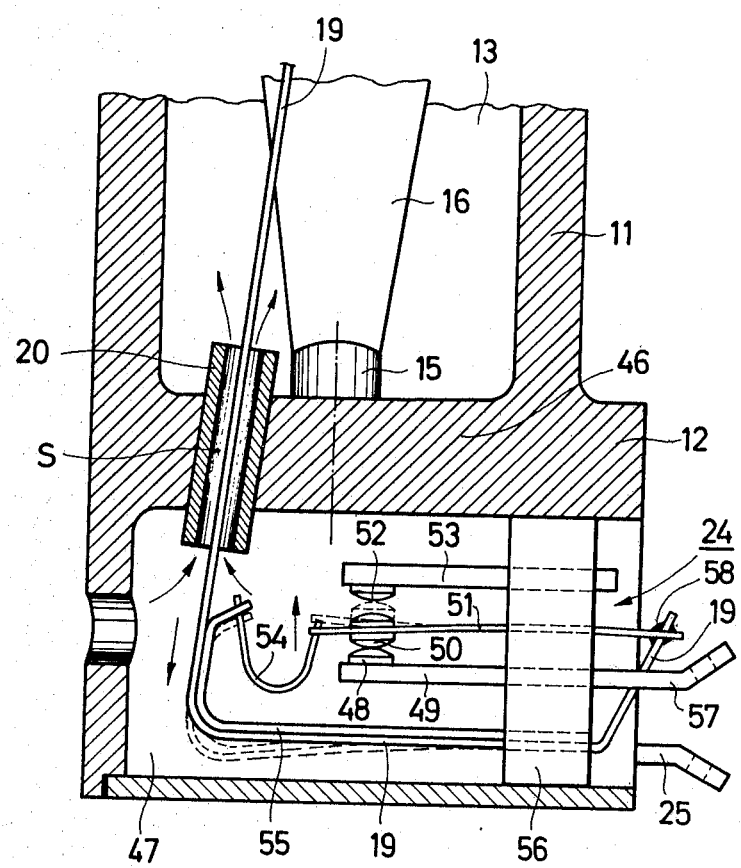
FIG. 2 shows that part of the FIG. 1 arrangement within the circle C, but in another plane, i.e., on the line II—II of FIG. 4.

The thermo-pneumatic pump of FIG. 1 consists of a sleeve-like pump housing 11, which is closed off at its lower end by a base member 12 and which encloses a pump chamber 13. A cylindrical bore 14, in which a cylindrical stud 15 is longitudinally displaceable, is formed in the base member 12 and is rearwardly offset (FIGS. 3 and 4) from the longitudinal axis of the pump housing 11. The cylindrical stud is part of a supporting element 16 which extends from the base member 12 to the other end of the pump housing 11. Starting from the cylindrical stud, the supporting element 16 gradually increases in width to form a slim trapezeum, so that at the other end it assumes the shape of a plate. The longitudinal edges 17 of this end, that are so formed, are guided in diametrically opposite axially parallel longitudinal channels 18 in the pump housing 11, the upper end of the supporting element 16 is set back in a stepped formation, and the individual shoulders serve to secure and guide a heating conductor 19 which extends downwards from the upper end of the supporting element 16 to the base member 12 without, however, touching the supporting element thereafter (FIG. 3). The heating conductor 19 forms a very sharp angle with the supporting element 16, i.e., it extends parallel thereto until it enters a metallic sleeve 20, the function and details of which will be described by reference to FIG. 2. The sleeve 20 lies in a plane which is disposed forwardly of the plane of FIG. 1 (FIG. 3), so that, because of its being tensioned, the heating conductor 19 applies to the supporting element 16, by way of the resilient switch-actuating member 55, torque and bending moment which are resisted by the supporting element 16 supported in the longitudinal channels 18. The axial component of the tensile stress in the heating conductor 19 is transmitted from the supporting element 16 to its cylindrical stud 15 and from here to a displacement device 21 which consists of a set-screw 22 and a check nut 23 (FIG. 1). The set-screw 22 is fitted in a thread in the base member 12; when this screw is turned, the supporting element 16 can be moved upwards and downwards, so that the initial position of the heating conductor 19 and therefore the switching point of an electric switch 24 can be varied, said switch being arranged in a recess in the base member 12 (FIG. 2). The supporting element 16 also serves for supplying current to the heating conductor 19. For this purpose, an electrical connecting tab 25 is located on the set-screw 22 and below the check nut 23.

At its upper end the pump housing 11 is provided with a cylindrical shoulder on which a closure cap 26 is fitted. Between the upper edge 27 of the pump housing 11 and a stop face 28 of the closure gap 26 is a valve seat 29 having an axially symmetrical knife-like seating edge 30. Bearing against this edge under the action of a resetting element 31 of elastomeric foam material is a disc 32 likewise made of elastomeric material. The end-face closure plate 33 of the cap 26 acts as a backing for the resetting element 31. Arranged in the closure plate 33 are two ports 34 and 35, the bores of which communicate with the valve space 36 above the disc 32. The valve seat 29 has a central bore 37.

The port 34 communicates, by way of a pipe 38 shown in broken lines, with an immersion tube 39 which is immersed, to the extent D, in a liquid 40 in a container 41. The other port 35 communicates with an indicating instrument 43 by way of a pipe 42 likewise shown in broken lines. Indicating instruments that can be used for this purpose are disclosed, for example, in German Pat. No. 17 98 094 and OS No. 26 09 882. Finally, the pump housing 11 is provided with one or more lugs 44 having holes 45, whereby the pump 10 can be secured to a holder, not illustrated.

In FIG. 2, parts similar to those previously described have the same reference numerals as said previously described parts. The following will also be seen. The base member 12 is provided, above a partition 46, with a recess 47 in which the electric switch 24, designed as a snap-action switch, is located. The switch consists of a fixed contact 48, which is secured to a rigid contact carrier 49, and of a moving contact 50 which is arranged on a resilient contact carrier 51. A complementary contact 52 on a rigid contact carrier 53 is used in the present case merely as an end stop for the resilient contact carrier 51 and it performs an electrical function. By way of a U-spring 54, the contact carrier 51 is hinged to an actuating element 55, which is made of leaf-spring material and is passed around the U-spring 54 as well as around the moving contact 50, the heating conductor 19 being under continuous tensile stress because of the spring action of the actuating member 55, which arrangement will be dealt with in greater detail below. Upward movement of the actuating element 55 causes the switch contact 50 to move rapidly downwards through a top dead center position; downward movement of the actuating element 55 into the position shown in broken lines causes the contact 50 with the resilient contact carrier 51 to move rapidly upwards into the position, likewise shown in broken lines, in which the rear face of the contact 50 moves into engagement with the co-operating contact 52. Between the U-spring 54 and the contact carrier 51 on the one hand and the actuating element 55 on the other, are located knife-edge bearings. The contact carriers 49, 51 and 53 and the actuating element 55 are arranged in a block 56 of insulating material, the contact carrier 49 being in the form of a connecting vane 57 located on the opposite side of the block of insulating material.

The metallic sleeve 20 is so arranged in the partition 46 in an inclined position corresponding to the direction of the heating conductor 19 that an annular gap which provides the clearance "S" is formed between the heating conductor 19 and the sleeve 20. The heating conductor 19 is wound around the actuating element 55 and, on the other side of the block 56 of insulating material, it is connected to the resilient contact carrier 51 so that the operating current does not have to pass through the knife-edge bearings of the U-spring 54. In the switching position illustrated in FIG. 2, the heating current flows from the connecting vane 57, by way of the contact carrier 49 and the contacts 48 and 50, to the contact carrier 51 and from here, by way of the junction 58, to the heating conductor 19 and thence back to the connecting vane 25 by way of the supporting element 16. Under the effect of the heating current, the heating conductor 19 extends longitudinally so that the actuating element 55 assumes the lower broken-line position because of its inherent elasticity. As this happens, the contact carrier 51 tilts with the contact 50 into the position also shown in broken lines, so that the pair of contacts 48/50 are opened with the result that the heating current is cut off. Because of the rapid dissipation of heat from the relaxed heating conductor 19, the latter cools down and contracts until it assumes the position shown in solid lines. The contact carrier 51 then likewise tilts back into the illustrated position so that the pair of contacts 48/50 are closed, and the heating period begins afresh.

The mode of operation of the illustrated pump is as follows: initially the movable parts of the pumps are in the position shown in solid lines in FIGS. 1 and 2, in which position the current circuit is closed. The heating conductor 19 heats up within 1/10 to ¼ second to several hundred degrees centigrade, so that the air contained in the pump chamber 13 expands more or less suddenly, and the resilient disc 32 lifts from the sealing edge 30 so that air is able to flow in the direction of the arrows drawn in the upper portion of FIG. 1. Because of the brief pressure surge and the considerably larger cross-section of the opening of the valve 59, only a small quantity of air is able to escape through the clearance gap "S" between the heating conductor 19 and the sleeve 20.

Following the above-described interruption of the heating current circuit, the heating conductor 19 cools down again very rapidly within a period of between 1 and 8 seconds, so that the air remaining in the pump chamber 13 likewise cools down and contracts. Since the valve 59 has closed in the meantime, air can blow back only through the clearance "S" between the heating conductor 19 and the sleeve 20, an adequate period of time being available for this to happen. After only a short time, the pressure in the pump chamber 13 again equates with the pressure of the atmosphere. The size of the clearance "S" will be selected to give optimum delivery by the pump. The above-described switching and pumping cycle is then repeated at a frequency of approximately 0.1 to 1 Hz, a quantity of air sufficient for enabling measurement and indication to be carried out being delivered to the immersion tube 39 through the port 34 and pipe 38.

It can also be seen from FIG. 3 that, because the bore 14 in the base member 12 is arranged eccentrically of the longitudinal axis of the pump housing, the supporting element 16 assumes a slightly inclined position which results in a progressive increase in the distance between the supporting element 16 and the heating conductor 19, in the direction of the base member 12. The eccentricity of the bore 14 makes it easier to accommodate the switch 24 in the recess 47 in the base member 12. Also, the recess 47 is laterally offset from the longitudinal axis of the pump housing 11, as can be seen from FIG. 4.

FIG. 5 further shows that the resilient disc 32 of the valve 59 has a cross-section that departs from a circular form, so as to promote the passage of air. At all points the disc 32 is spaced a sufficient distance from the valve seat 29 so that impedement by friction cannot occur. The resetting element 31 of elastomeric foam material has the shape of a flattened cylinder.

What is claimed is:

1. A thermo-pneumatic pump, comprising: an elongated housing forming a pump chamber and having at least one outlet valve for controlling the flow of pumped fluid therefrom; an elongated heating conductor capable of expanding longitudinally when heated and configured to be disposed in the pump chamber; a metallic supporting element extending longitudinally through the pump chamber substantially parallel to the heating conductor and connected at one end to one end of the heating conductor; actuatable switching means for connecting heating current to the heating conductor by way of the supporting element including an actuating element connected to the other end of the heating conductor for actuating and deactuating the switching means in response to the expansion and contraction of the heating conductor; and means mounting the supporting element for longitudinal displacement in the pump chamber to adjust the switching point of the actuating element.

2. The pump according to claim 1, wherein the means mounting the support element comprises a cylindrical stud connected to the other end of the supporting element and displaceable in a bore in the housing, a set screw for positioning the stud and means forming channels in the housing for guiding the edges of the one end of the supporting element.

3. The pump according to claim 1, wherein the heating conductor is rectilinear and extends through the pump chamber substantially parallel to the major axis thereof.

4. The pump according to claim 1, wherein the switching means is secured to the housing outside of the pump chamber the vessel includes means forming an opening in the housing comprising an inlet port for the chamber and said other end of the heating conductor extends with clearance through the opening in the housing and is connected to the actuating element of the switching means adjacent the point where it passes through the opening.

5. The pump according to claim 4, wherein the means forming the opening in the housing comprises a metallic sleeve having an inside diameter greater than the cross-section of the heating conductor.

6. The pump according to claim 1 or claim 4, wherein the switching means is disposed at one end of the housing and the outlet valve is disposed at the other end of the pump housing.

7. The pump according to claim 6, wherein the outlet valve is axially symmetrical and disposed coaxially with the housing.

8. The pump according to claim 1, wherein the outlet valve comprises a valve seat having an axially symmetrical knife-like sealing edge, a valve disc of elastomeric material, and a return element of elastomeric foam material.

9. The pump according to claim 8, further comprising a housing closure cap for securing at one end of the housing and having at least one port for receiving an air pipe.

10. The pump according to claim 9, wherein the cap is provided with two ports.

11. The pump according to claim 1, wherein the means mounting the supporting element is disposed alongside the switching means.

12. The pump according to claim 1, wherein the switching means comprises a snap-action switch.

13. The pump according to claim 1, wherein the heating conductor comprises a round resistor wire having a diameter of between 0.1 and 0.3 mm.

* * * * *